(12) United States Patent
Vitel et al.

(10) Patent No.: US 9,986,868 B2
(45) Date of Patent: Jun. 5, 2018

(54) BREWING DEVICE WITH GROUND COFFEE QUANTITY CONTROL AND COFFEE MACHINE COMPRISING SUCH A DEVICE

(75) Inventors: Arnaud Vitel, Andouille (FR); Gilles Lebuffe, Conde sur Vire (FR); Thierry Gailhard, Chaponnay (FR)

(73) Assignee: SEB S.A., Ecully (FR)

( * ) Notice: Subject to any disclaimer, the term of this patent is extended or adjusted under 35 U.S.C. 154(b) by 2066 days.

(21) Appl. No.: 13/151,297

(22) Filed: Jun. 2, 2011

(65) Prior Publication Data

US 2011/0297002 A1 Dec. 8, 2011

(30) Foreign Application Priority Data

Jun. 8, 2010 (FR) ...................................... 10 54502

(51) Int. Cl.
*A47J 31/40* (2006.01)
*A47J 31/36* (2006.01)

(52) U.S. Cl.
CPC ................................. *A47J 31/3614* (2013.01)

(58) Field of Classification Search
CPC ...... A47J 31/36; A47J 31/401; A47J 31/3614; B67D 1/001; B67D 1/0029; B67D 2210/00123; F04B 1/26; F04B 3/003
USPC .......................... 99/283, 287, 295, 297, 302 P
See application file for complete search history.

(56) References Cited

U.S. PATENT DOCUMENTS

| | | | | |
|---|---|---|---|---|
| 3,357,339 | A | * | 12/1967 | Schaab ........................... 99/283 |
| 4,188,863 | A | * | 2/1980 | Grossi ............................ 99/286 |
| 4,681,028 | A | * | 7/1987 | Schmed et al. ............. 99/289 R |
| 4,797,296 | A | * | 1/1989 | Meier et al. .................. 426/433 |
| 4,993,315 | A | * | 2/1991 | Huber et al. ................ 99/289 R |
| 5,224,414 | A | * | 7/1993 | Hunt .............................. 99/286 |
| 5,241,898 | A | * | 9/1993 | Newnan ......................... 99/280 |
| 5,255,594 | A | * | 10/1993 | Grossi ............................ 99/287 |
| 5,259,296 | A | * | 11/1993 | Mikael et al. .................. 99/280 |
| 5,495,793 | A | * | 3/1996 | Muis et al. ..................... 99/280 |
| 5,704,275 | A | * | 1/1998 | Warne ............................ 99/281 |
| 5,722,313 | A | * | 3/1998 | Schmed .................... 99/289 R |
| 5,862,738 | A | * | 1/1999 | Warne ............................ 99/281 |
| 5,901,636 | A | * | 5/1999 | Witziers et al. ................ 99/283 |
| 5,964,142 | A | * | 10/1999 | Tio ............................ 99/289 R |

(Continued)

FOREIGN PATENT DOCUMENTS

| EP | 0521561 A1 | 1/1993 |
|---|---|---|
| EP | 0559620 A1 | 9/1993 |

(Continued)

*Primary Examiner* — Eric Stapleton
(74) *Attorney, Agent, or Firm* — The Webb Law Firm

(57) ABSTRACT

A brewing device (2) for an espresso-type coffee machine including a brewing chamber (12) for receiving ground coffee, a movably mounted pressure piston (13) in translation with a stroke that extends from an upper retracted position in which the pressure piston (13) is located above the brewing chamber (12) to a lower tamping position in which the pressure piston (13) enters said brewing chamber (12) and a potentiometer controlled by driving means during the stroke of the pressure piston (13) to measure the tamping position of said pressure piston and to thereby calculate the height of the compressed cake of ground coffee. The driving means only act on the potentiometer for a portion of the stroke of the pressure piston (13).

15 Claims, 4 Drawing Sheets

(56) References Cited

U.S. PATENT DOCUMENTS

| | | | |
|---|---|---|---|
| 6,205,909 B1* | 3/2001 | Giannelli | 99/302 P |
| 6,253,664 B1* | 7/2001 | Giannelli | 99/302 P |
| 6,779,436 B2* | 8/2004 | Guindulain Vidondo | 99/302 P |
| 7,024,985 B2* | 4/2006 | Park | 99/302 P |
| 7,594,469 B2* | 9/2009 | O'Connor et al. | 99/282 |
| 7,673,555 B2* | 3/2010 | Nosler et al. | 99/279 |
| 7,861,646 B2* | 1/2011 | Bockbrader | 99/323.3 |
| 7,927,642 B2* | 4/2011 | Campetella et al. | 426/433 |
| 8,028,616 B2* | 10/2011 | Van Der Meer et al. | 99/284 |
| 8,037,811 B2* | 10/2011 | Bunn | 99/280 |
| 8,250,969 B2* | 8/2012 | Sampaoli et al. | 99/287 |
| 8,371,211 B2* | 2/2013 | Nosier et al. | 99/279 |
| 8,408,117 B2* | 4/2013 | De'Longhi Giuseppe | 99/289 R |
| 8,601,937 B2* | 12/2013 | Campetella et al. | 99/286 |
| 8,733,232 B2* | 5/2014 | Buttiker Philipp | 99/302 P |
| 8,770,099 B2* | 7/2014 | Reyhanloo | 99/453 |
| 2005/0193891 A1* | 9/2005 | Garson et al. | 99/279 |
| 2006/0000851 A1* | 1/2006 | Girard et al. | 222/129.1 |
| 2007/0283816 A1* | 12/2007 | O'Connor et al. | 99/282 |
| 2008/0148959 A1* | 6/2008 | Bockbrader | 99/323.3 |
| 2011/0189362 A1* | 8/2011 | Denisart et al. | 426/433 |

FOREIGN PATENT DOCUMENTS

| | | |
|---|---|---|
| EP | 0627186 A1 | 12/1994 |
| FR | 2594671 A1 | 8/1987 |
| WO | 9912456 A1 | 3/1999 |

* cited by examiner

BREWING DEVICE WITH GROUND COFFEE QUANTITY CONTROL AND COFFEE MACHINE COMPRISING SUCH A DEVICE

BACKGROUND OF THE INVENTION

1. Field of the Invention

The present invention relates to a brewing device for an espresso-type coffee machine, in particular a brewing device in which an amount of ground coffee introduced into a brewing chamber is controlled during each cycle to ensure consistent results for a selected beverage type.

2. Description of the Prior Art

The amount of ground coffee to be introduced into the brewing chamber can be varied to obtain different beverages including a strong espresso known as a ristretto, espresso, a weaker espresso known as a lungo, etc.

Usually, the brewing device of a coffee machine comprises a brewing chamber that is supplied with ground coffee and a pressure piston that compresses the ground coffee in the brewing chamber into a cake. Generally, the ground coffee is produced by a coffee grinder equipped with grinding wheels, one of which is rotated. The amount of ground coffee supplied corresponds to a rotation time of the grinding wheel, this rotation time being stored in a control circuit. However, several parameters can affect the amount of ground coffee supplied for a given rotation time of the grinding wheel, such as the amount of wear of the grinding wheels or the hardness of the coffee beans.

To measure this deviation, it is known to add a measuring device to measure the thickness of the compressed cake of ground coffee, this thickness being representative of the amount of ground coffee introduced into the brewing chamber. The thickness of the cake of ground coffee is calculated based on the measurement of the tamping position of the pressure piston in the brewing chamber.

Thus, document EP0627186 discloses a beverage preparation apparatus that comprises a brewing device comprising a brewing chamber that receives the ground coffee and a pressure piston that is axially displaced by an electric motor from a standby position outside the chamber to a tamping position inside the chamber. A sensor associated with a control device is able to calculate the tamping position of the piston in the chamber by counting the number of revolutions made by the motor. The sensor may be a Hall effect sensor associated with several magnets that are rotated or an optical sensor associated with a slotted disc rotated by the motor. The tamping position of the piston can thus be compared to a predetermined value, a discrepancy between these two values potentially indicating too little or too much ground coffee present in the chamber.

However, in this construction, the sensors and associated moving parts are expensive and sophisticated and can lead to failures. In particular, an optical sensor is susceptible to contamination in the environment surrounding an espresso machine.

Furthermore, document EP0559620 discloses a brewing device comprising a brewing chamber that pivots between a position in which it receives the ground coffee and a tamping position in which the axis of the chamber is aligned with a pressure piston. The pressure piston is axially displaced by an electric motor from a standby position outside the chamber to a tamping position inside the chamber. A sensor associated with a control device is able to calculate the tamping position of the piston in the chamber by counting the number of revolutions made by the motor. The sensor can be an incremental sensor associated with a rotating disc driven by the motor. Alternatively, a linear potentiometer connected to the pressure piston can be used.

While the use of a linear potentiometer appears less expensive than the use of the other sensors mentioned above, it is nevertheless an expensive, bulky component that is difficult to automatically install on an electronic board. The use of a linear potentiometer seems possible only in the case of a brewing device with a short pressure piston stroke, which requires that the displacement of the pressure piston be combined with a movement of the chamber to load the ground coffee. Thus, the mechanics of the brewing device become quite complicated. In addition, since the linear potentiometer has a long stroke, the seal provided by a standard component may be unreliable in the context of a coffee machine.

The object of the present invention is to remedy the drawbacks indicated above and to provide a brewing device that is able to accurately control the amount of ground coffee introduced into a brewing chamber and that is simple in design and inexpensive to implement.

Another object of the present invention is to provide a brewing device that operates reliably.

Yet another object of the invention is to provide an espresso-type coffee machine comprising a brewing device of the type indicated above.

SUMMARY OF THE INVENTION

These objects are achieved with a brewing device for an espresso-type coffee machine comprising a brewing chamber for receiving ground coffee, a movably mounted pressure piston in translation with a stroke that extends from an upper retracted position in which the pressure piston is located above the brewing chamber to a lower tamping position in which the pressure piston enters said brewing chamber, and a potentiometer controlled by driving means during the stroke of the pressure piston to measure the tamping position of said pressure piston and thereby calculate the height of the compressed cake of ground coffee, the driving means only acting on the potentiometer for a portion of the stroke of the pressure piston.

In such a brewing device, the portion of the stroke of the pressure piston during which the measurement of the tamping position is taken is less than the total stroke. For example, the cake of ground coffee varies from 10 to 20 millimeters in height between the weakest type of coffee and the strongest type of coffee, for a tamping position measurement range of 10 millimeters, while the total stroke of the piston is greater than 50 millimeters.

Thus, by mechanically driving the potentiometer for only a portion of the stroke of the piston corresponding to the measurement range of the tamping position, it is possible to use a standard, simple, reliable, very economical component while achieving a high degree of measurement accuracy. In other words, the measurement range of the tamping position is adjusted to the working stroke of the potentiometer.

Advantageously, the potentiometer is a rotary potentiometer having an axis of rotation.

This arrangement allows for a very inexpensive component, as the rotary potentiometer is a standard component, manufactured in very large numbers.

Preferably, the driving means comprise a lever arranged along the axis of rotation of the potentiometer that engages with the contact surface arranged at the end of an arm fixed to the pressure piston.

This arrangement provides for an extremely simple construction with which to control the potentiometer, consisting, for example, of two simple plastic parts.

Advantageously, the arm fixed to the pressure piston is an upper arm that drives the lever throughout a lower portion of the stroke of the pressure piston up to the tamping position and the driving means comprise a second contact surface arranged at the end of a lower arm fixed to the pressure piston, driving the lever throughout an upper portion of the stroke of the pressure piston up to the retracted position.

This arrangement provides a simple, economical method of returning the potentiometer into position.

Preferably, the driving means act on the potentiometer for less than half of the stroke of the pressure piston.

Advantageously, the axis of rotation of the potentiometer comprises braking means.

This arrangement ensures contact between the contact surface and the lever, particularly throughout the lower portion of the stroke of the piston. When the contact surface comes into contact with the lever, the impact can cause the lever to be pushed downward beyond the stop position of the contact surface.

Preferably, the braking means are formed by an elastomer O-ring arranged in a cover arranged around the potentiometer, said O-ring being fitted to the diameter of the axis of rotation to produce friction when the axis is rotating.

This arrangement provides for a simple, inexpensive solution for the braking of the axis and also reinforces the seal of the potentiometer.

Advantageously, the lever and the cover comprise, respectively, stops and protrusions limiting the rotation of the axis of the potentiometer.

The two arms, each equipped with their contact surface, form a fork that traps the lever of the potentiometer. This arrangement ensures that the end of the lever remains in this fork in the event of abnormal impact to the brewing device during transport or use. During such impact, the inertia of the lever cannot move it beyond the stops limiting the rotation of the axis of the potentiometer.

Advantageously, the brewing device comprises a hydraulic cylinder to drive the pressure piston.

The invention also relates to an espresso-type coffee machine comprising a brewing device as described above.

BRIEF DESCRIPTION OF THE DRAWINGS

The invention will be better understood by reviewing the embodiment, which is in no way restrictive, illustrated in the attached figures, among which.

DETAILED DESCRIPTION OF THE INVENTION

Figure 1:
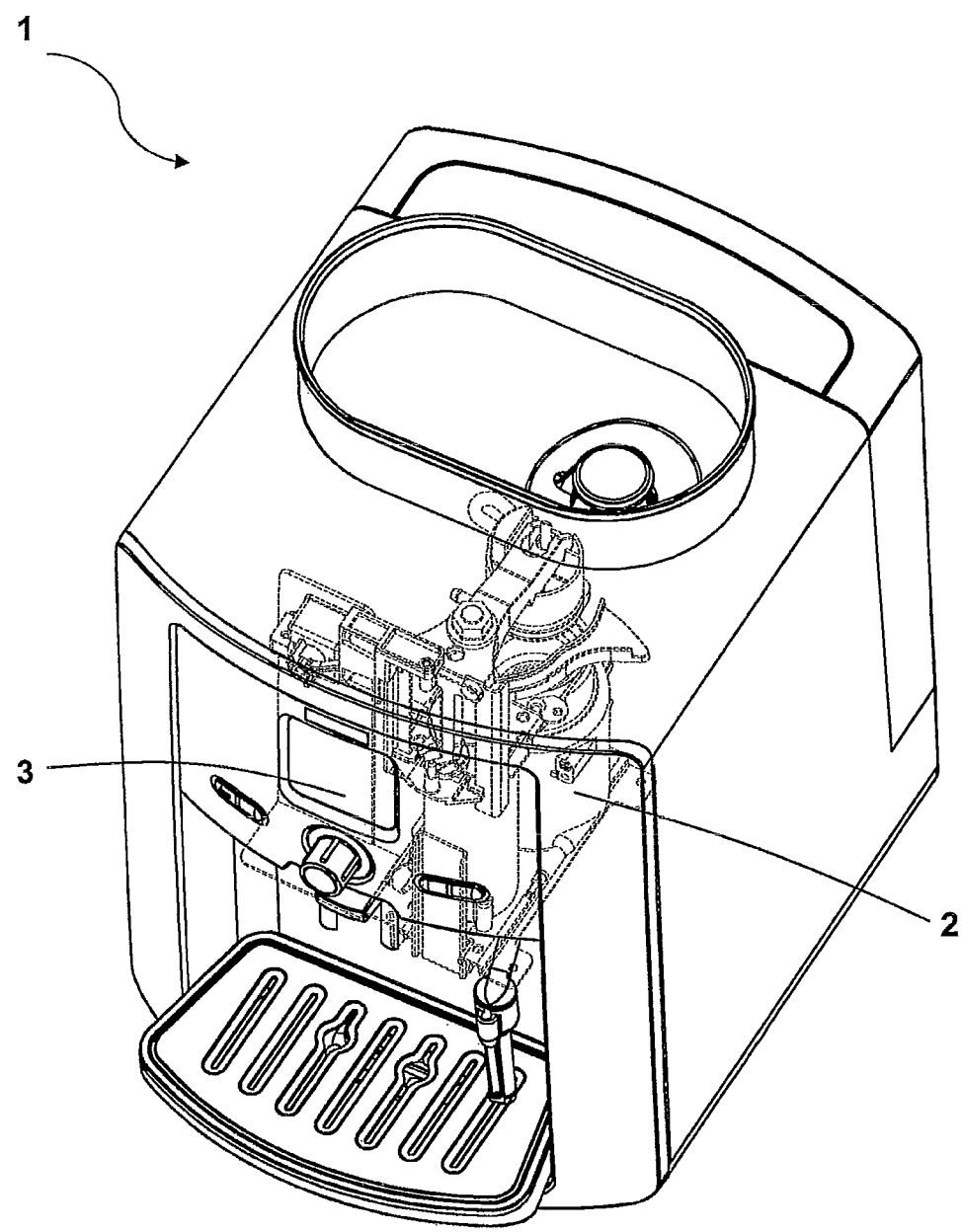
FIG. 1 is a perspective view of an espresso machine incorporating a brewing device as a particular embodiment of the invention.

In the embodiment illustrated in FIG. 1, a brewing device 2 is intended to equip an automatic coffee machine 1 comprising a cold water supply, a dispenser of ground coffee from a coffee grinder integrated with the dispenser (not shown in the figures) and an electronic control device 3 for controlling and managing the brewed beverage preparation cycles.

Such a brewing device 2 illustrated in FIGS. 2 through 6 comprises, in particular, a body 11 with a vertical longitudinal axis containing a brewing chamber 12 that is able to receive a pressure piston 13 that is movably mounted along axis A by means of a driving mechanism, pumping means (not shown) to circulate the water and the coffee, and a boiler 14 to heat the water to prepare the coffee in the brewing chamber 12. According to a particular, yet non-restrictive, characteristic of the invention, the body 11 is arranged laterally to a single-acting hydraulic cylinder 15 comprising an upper rod 16 supporting an arm 17 forming a cross bar, the free end of which is connected to the pressure piston 13, the strokes of the pressure piston 13 and of the hydraulic cylinder being almost parallel. The pressure piston 13 travels between an upper retracted position in which it is located above the brewing chamber 12 and a lower tamping position in which it enters the brewing chamber 12. In the lower tamping position, the pressure piston 13 compresses the ground coffee in the brewing chamber 12 to form a compressed cake of ground coffee.

The boiler 14 and the body 11 are formed by a single piece of heat conductive material that contains an electrical resistance heater and channels for the flow and heating of the water, the inlets of the channels being connected via the pumping means to a cold water reservoir and the ends of these channels opening into the bottom of the brewing chamber 12. The pressure piston 13 has a duct through which the coffee flows, emptying through an outlet port, while the pumping means are designed to create an upward flow of water in the brewing chamber 12 toward the duct when the pressure piston 13 closes the chamber. Such a brewing device 2 was described, for example, in greater detail in patent application PCT WO 99/12456.

Figure 4:
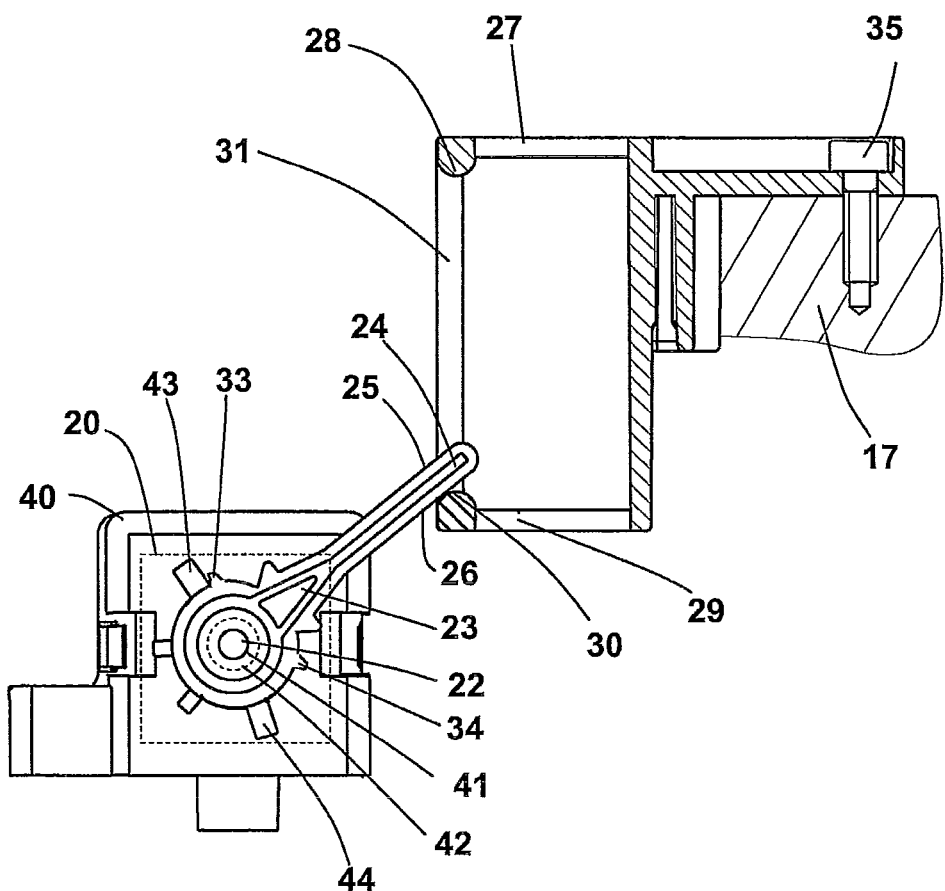
FIG. 4 is a detailed view of a potentiometer of the brewing device illustrated in FIG. 3.

As illustrated in FIG. 4, the brewing device 2 comprises a rotary potentiometer 20 (indicated by the dotted lines) arranged vertically on a support 21 and fixed to the hydraulic cylinder 15. The potentiometer 20 comprises an axis of rotation 22, at the end of which is arranged a lever 23 comprising a free end 24 with an upper surface 25 and a lower surface 26 (FIG. 4).

The portion of the arm 17 forming a cross bar of the hydraulic cylinder 15 that is opposite the pressure piston comprises a lower arm 29 fixed by a screw 35. A lower contact surface 30 is arranged transversely at the end of the lower arm 29. The arm 17 forming a cross bar comprises an upper arm 27, this upper arm 27 being superimposed on the lower arm 29, an upper contact surface 28 being arranged transversely at the end of said upper arm 27. The bearing surfaces 28, 30 are cylindrical in form at the point where they contact the end of the lever and are connected, at their respective ends, by a vertical beam 31, 32 to form a control frame. The potentiometer 20 is arranged so that the free end 24 of the lever 23 is arranged in the control frame.

Figure 2:
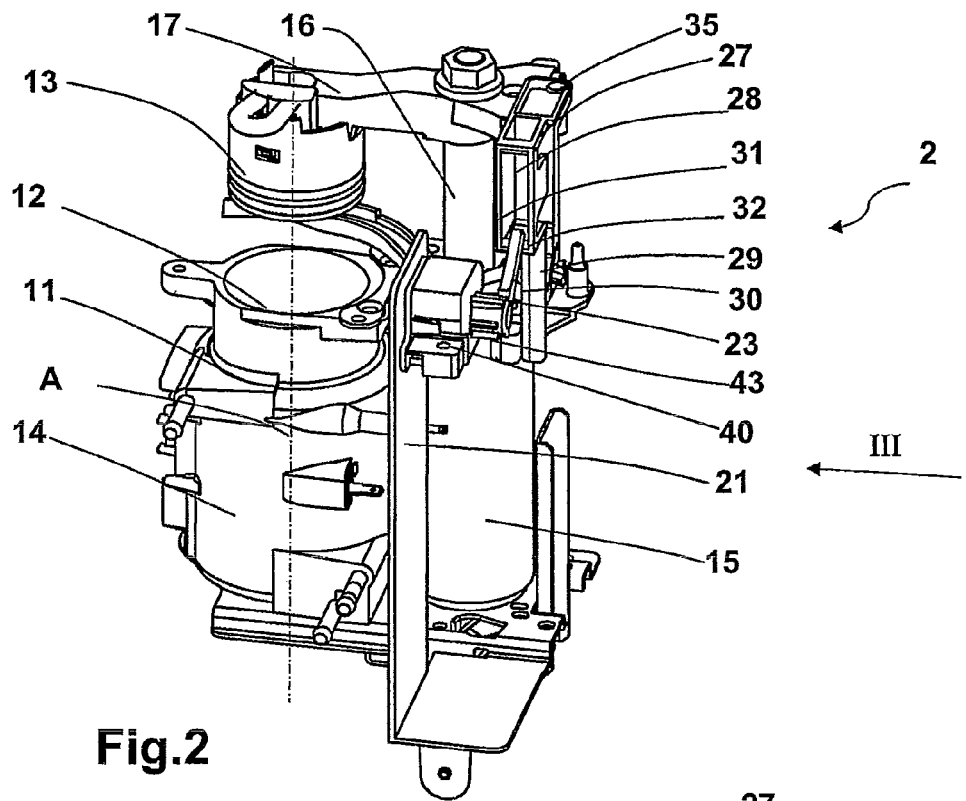
FIG. 2 is a perspective view of the brewing device of FIG. 1 with the pressure piston illustrated in retracted position.
Figure 3:
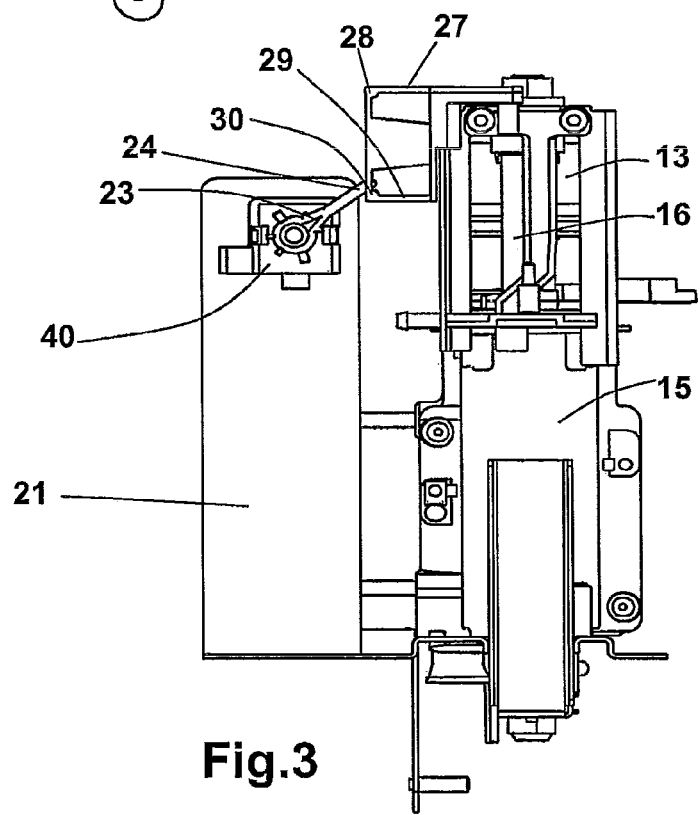
FIG. 3 is a side view in direction III of the brewing device illustrated in FIG. 2.

As shown in FIGS. 2 and 3, when the pressure piston 13 is retracted from the brewing chamber 12, the lever 23 slants upwards at about 45° relative to horizontal while the lower surface 26 of the free end 24 rests on the lower contact surface 30.

Figure 5:
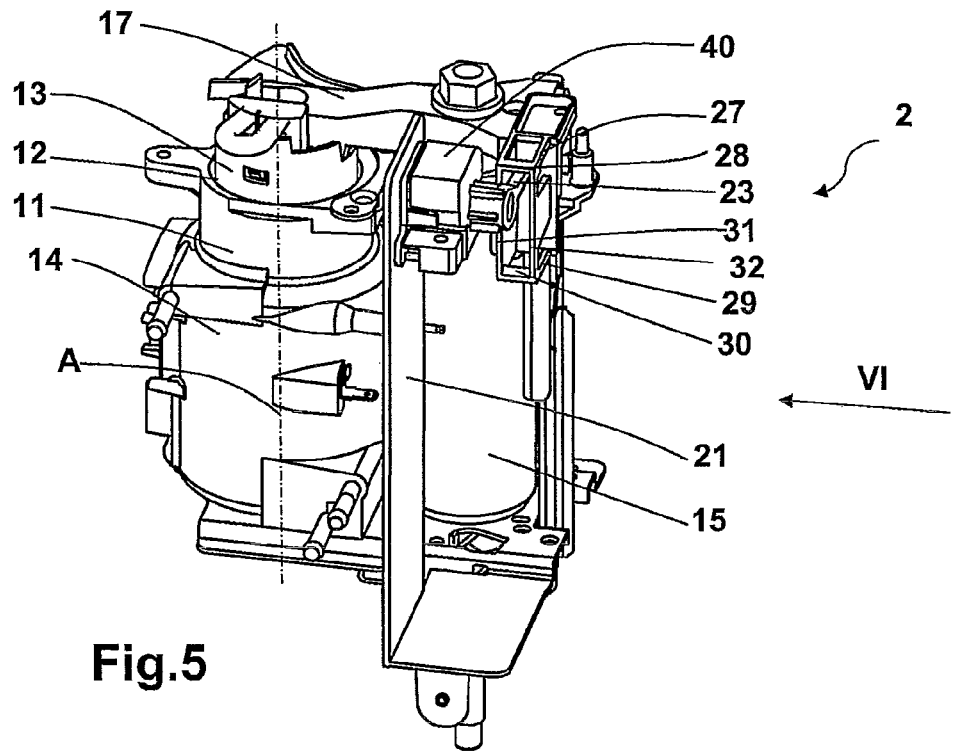
FIG. 5 is a perspective view of the brewing device of FIG. 2 with the pressure piston illustrated in tamping position.
Figure 6:
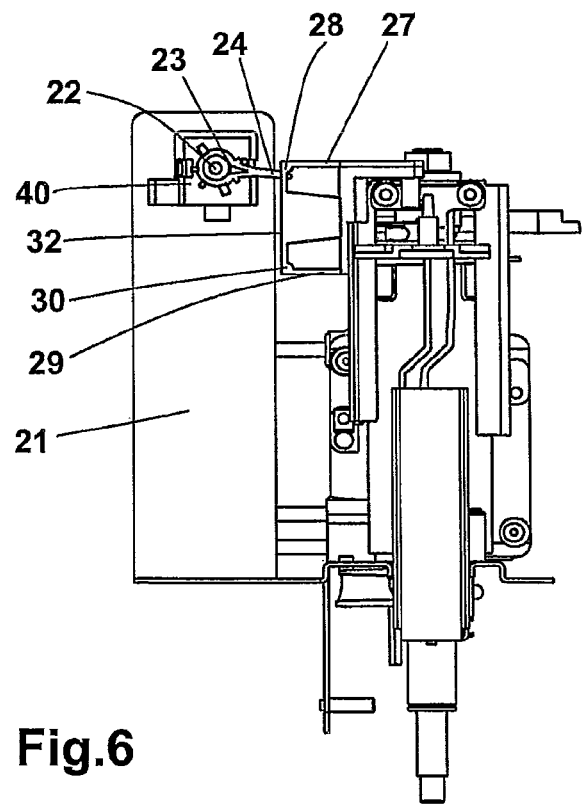
FIG. 6 is a side view in direction VI of the brewing device illustrated in FIG. 5.

As shown in FIGS. 5 and 6, when the pressure piston 13 is in tamping position in the brewing chamber 12, the lever 23 slants downwards at approximately 15° relative to horizontal while the upper surface 25 of the free end 24 rests on the upper contact surface 28. For example, this position of the lever 23 corresponds to a tamping position of the pressure piston 13 which results in a cake of ground coffee compressed approximately 13 millimeters.

The electronic control device 3 can, depending on the type of beverage selected by the user, command the grinder to introduce a varying amount of ground coffee into the brewing chamber 12, corresponding, for example, to a programmed grinding time. For example, the cake of ground coffee varies from 10 to 20 millimeters in height between the weakest type of coffee (lungo) and the strongest type of coffee (ristretto), for a tamping position measurement range of 10 millimeters, while the total stroke of the pressure piston is equal to 50 millimeters. Thus, the control frame is sized so that the distance between the lower contact surface 30 and the upper contact surface 28 is equal to the total stroke of the pressure piston 13 minus the measurement range. The thickness of the free end 24 of lever 23 must also be subtracted from this distance. Thus, if the free end of the lever is 4 millimeters thick: 50−10−4=a distance of 36 millimeters.

The position of the potentiometer 20 for a cake of ground coffee compressed to a maximum thickness of 20 millimeters corresponds to a position of the lever 23 of 40° upwards. For a cake of ground coffee compressed to a minimum thickness of 10 millimeters, the position of the potentiometer 20 corresponds to a position of lever 23 of 40° downwards. The brewing chamber 12 may comprise a stop with which the pressure piston comes into contact so as not to exceed the minimum thickness.

Thus, the tamping position measurement range of 10 millimeters corresponds to a rotation of the axis of the potentiometer 20 of approximately 80°, which provides a precision of approximately 0.2 millimeters if the length of the lever 23 is 30 millimeters.

As illustrated in FIG. 4, a cover 40 is arranged around the potentiometer 20. This cover 40 comprises an opening 41 equipped with a groove into which an elastomer O-ring 42 is placed (as indicated by the dotted lines). The axis of rotation 22 of the potentiometer 20 is arranged in the opening 41 and the O-ring 42 is fitted to the diameter of the axis of rotation 22 to produce friction when the axis is rotating.

The cover 40 comprises an upper protrusion 43 and a lower protrusion 44. The lever 23 comprises an upper stop 33 and a lower stop 34. When the pressure piston 13 is retracted from the brewing chamber 12, the lever 23 is in an upward-slanting position in which the upper stop 33 is almost in contact with the upper protrusion 43. When the pressure piston 13 is in the lowest possible tamping position in the brewing chamber 12, the lever 23 is in a downward-slanting position in which the lower stop 34 is almost in contact with the lower protrusion 44. In normal operation, the stops do not come into contact with the protrusions.

The potentiometer has an electrical stroke of 230°. In one embodiment, the potentiometer comprises an electrical stroke limited to approximately 100° to maximize electronic precision over 80° of the mechanical angle used to measure the position of the pressure piston.

In operation, the user selects the beverage type and starts preparation using the electronic control device 3. A grinding time to produce a cake of ground coffee compressed to a theoretical height for the selected beverage as well as the actual height of the cake of ground coffee produced by the previous cycle for the same beverage type are stored in the memory. Based on these two values, the electronic control device 3 will calculate an adjusted grinding time based on a coefficient k generated, for example, from the ratio between the theoretical height and the actual height. The adjusted grinding time may be calculated based on a more sophisticated formula that takes the actual heights from multiple previous cycles into account. Once the adjusted grinding time is calculated, the electronic control device 3 will command the grinder to supply the brewing chamber with the predetermined amount of ground coffee.

Once the grinding time is complete, the hydraulic cylinder 15 is powered and drives the pressure piston 13 and the control frame from the upper position illustrated in FIGS. 2 and 3 to the lower position illustrated in FIGS. 5 and 6. The lower contact surface 30 then separates from the lower surface 26 of the free end 24 of the lever 23 and descends until the upper contact surface 28 comes into contact with the upper surface 25 to drive the free end 24 of the lever 23 up to the point at which the pressure piston 13 reaches the tamping position. In this tamping position, the electronic control device 3 measures the signal generated by the potentiometer 20 to calculate the height of the compressed cake of ground coffee, this height being stored in the memory.

Once the beverage has been prepared and dispensed, the electronic control device 3 commands the hydraulic cylinder 15 to return from the lower position to the upper position. The upper contact surface 28 then separates from the upper surface 25 of the free end 24 of the lever 23 and ascends until the lower contact surface 30 comes into contact with the lower surface 26 in order to drive the free end 24 of the lever 23 up to the point at which the hydraulic cylinder 15 reaches the upper stop. The electronic control device thus detects that the pressure piston has properly returned to the upper position.

Of course, the invention is in no way restricted to the embodiment described and illustrated, which is provided only as an example. Modifications are possible, particularly as concerns the design of the various elements or the substitution of technical equivalents, without falling outside the scope of protection of the invention.

In one embodiment, the potentiometer is a linear potentiometer comprising a control pin arranged between the upper and lower contact surfaces.

In another embodiment, the rotary potentiometer comprises a lever equipped with a return spring in the upper position, a solution that does not require a lower arm.

In yet another embodiment, the potentiometer comprises a pinion and a rack is fixed to the pressure piston to drive the pinion over a portion of the stroke of the pressure piston.

The invention claimed is:

1. A brewing device for an espresso-type coffee machine comprising a brewing chamber for receiving ground coffee, a movably mounted pressure piston in translation with a stroke that extends from an upper retracted position in which the pressure piston is located above the brewing chamber to a lower tamping position in which the pressure piston enters said brewing chamber and a potentiometer controlled by a driving mechanism during the stroke of the pressure piston to measure the tamping position of said pressure piston and to thereby calculate the height of the compressed cake of ground coffee, the driving mechanism only acting on the potentiometer for a portion of the stroke of the pressure piston.

2. A brewing device according to claim 1, wherein the potentiometer is a rotary potentiometer having an axis of rotation.

3. A brewing device according to claim 2, wherein the axis of rotation of the potentiometer comprises braking means.

4. A brewing device according to claim 3, wherein the braking means are formed by an elastomer O-ring arranged in a cover arranged around the potentiometer, said O-ring being fitted to the diameter of the axis of rotation to produce friction when the axis is rotating.

5. A brewing device according to claim 2, wherein the lever and the cover comprise, respectively, stops and protrusions limiting the rotation of the axis of the potentiometer.

6. A brewing device according to claim 2, wherein the driving mechanism acts on the potentiometer for less than half of the stroke of the pressure piston.

7. An espresso-type coffee machine comprising a brewing device as set forth in claim 2.

8. A brewing device according to claim 2, wherein the driving mechanism comprises a lever arranged along the axis of rotation of the potentiometer that engages with the contact surface arranged at the end of an arm fixed to the pressure piston.

9. A brewing device according to claim 8, wherein the driving mechanism acts on the potentiometer for less than half of the stroke of the pressure piston.

10. An espresso-type coffee machine comprising a brewing device as set forth in claim 8.

11. A brewing device according to claim 8, wherein the arm fixed to the pressure piston is an upper arm that drives the lever throughout a lower portion of the stroke of the pressure piston up to the tamping position and in which the driving mechanism comprises a second contact surface arranged at the end of a lower arm fixed to the pressure piston, driving the lever through an upper portion of the stroke of the pressure piston up to the retracted position.

12. A brewing device according to claim 11, wherein the driving mechanism acts on the potentiometer for less than half of the stroke of the pressure piston.

13. A brewing device according to claim 1, wherein the driving mechanism acts on the potentiometer for less than half of the stroke of the pressure piston.

14. A brewing device according to claim 1, wherein said brewing device further comprises a hydraulic cylinder to drive the pressure piston.

15. An espresso-type coffee machine comprising a brewing device, the brewing device comprising a brewing chamber for receiving ground coffee, a movably mounted pressure piston in translation with a stroke that extends from an upper retracted position in which the pressure piston is located above the brewing chamber to a lower tamping position in which the pressure piston enters said brewing chamber and a potentiometer controlled by a driving mechanism during the stroke of the pressure piston to measure the tamping position of said pressure piston and to thereby calculate the height of the compressed cake of ground coffee, the driving mechanism only acting on the potentiometer for a portion of the stroke of the pressure piston.

* * * * *